United States Patent

Rutty

[11] 3,824,700
[45] July 23, 1974

[54] LEVEL WITH NOVEL VIAL MOUNTING ARRANGEMENT

[75] Inventor: Edward Charles Rutty, Portland, Conn.

[73] Assignee: The Stanley Works, New Britain, Conn.

[22] Filed: Oct. 6, 1972

[21] Appl. No.: 295,517

[52] U.S. Cl. .................................... 33/379, 33/89
[51] Int. Cl. ............................................ G01c 9/28
[58] Field of Search ............. 33/379, 381, 382, 383, 33/342, 347, 384, 89

[56] References Cited
UNITED STATES PATENTS

| | | | |
|---|---|---|---|
| 3,190,010 | 6/1965 | Johnson | 33/381 |
| 3,488,868 | 1/1970 | Gutowski | 33/75 R X |
| 3,513,558 | 5/1970 | Kuchta | 33/381 |
| 3,750,301 | 8/1973 | Johnson | 33/384 X |

*Primary Examiner*—Louis R. Prince
*Assistant Examiner*—Charles E. Phillips

[57] ABSTRACT

A combination square consisting of a level and rule has mounted thereon a level vial holder comprising a mounting member and a level vial. The level vial is retained in the mounting member in a manner such that with the level vial holder mounted on the combination square the level vial is exposed for a 360° reading. The level vial is retained in the mounting member in a recess which receives both ends of the vial with a snap fit whereby to mechanically lock the vial in place. For purposes of mounting the level vial holder on the combination square, the mounting member is provided with a pair of spaced depending arms between which there is formed an arcuate surface. The level vial holder is mounted by adhesive or other suitable means on a seat comprising a planar surface formed at the outer end of an upstanding portion provided on one leg of the level such that the depending arms of the mounting member straddle the upstanding portion in abutting relation thereto and the arcuate surface is in engagement with the planar surface.

8 Claims, 6 Drawing Figures

PATENTED JUL 23 1974    3,824,700

LEVEL WITH NOVEL VIAL MOUNTING ARRANGEMENT

BACKGROUND OF THE INVENTION

It has been known heretofore in the prior art to provide a measuring tool and more particularly, a level, with a level vial to permit the performance of measuring and aligning functions through the use thereof. Commonly, the level vial comprises a tube or vial which contains a suitable liquid therein and which has some type of indicating means provided on the exterior surface of the vial. The latter indicating means often consists of either a single center line or a pair of spaced lines which function as a reference for aligning a bubble in the liquid relative thereto. In turn, the level vial is most commonly retained in a holder which is mountable on a portion of the level. One exemplary teaching of a prior art form of such a level with level vial can be found in U.S. Pat. No. 3,513,558, which issued on May 26, 1970.

There are basically two primary criteria which all levels embodying a level vial should meet. First, it is desirable from the standpoint of achieving economies of mass production that the level vial be capable of being easily and rapidly assembled in the holder and the holder in turn on the level. Secondly, it is necessary that the level vial be capable of accurate calibration relative to a planar surface of the level in order to ensure that no deviations exist therebetween which might lead to the obtaining of inaccurate readings from usage of the level vial mounted on the level.

Although many different methods of assembling the level vial on the level have been tried heretodate, none of these prior assembly methods has proven to be entirely satisfactory. They have suffered disadvantageously in some respects either from the standpoint of the method whereby the level vial is mounted in the holder and/or the method by which the holder with level vial in place thereon is mounted on the level. A further characteristic of the conventional level with level vial, which comprises a disadvantage to the employment thereof in some applications, is that a reading is unobtainable from the level vial when the vial is inverted.

Accordingly, it is an object of the present invention to provide a novel and improved mounting arrangement for mounting a level vial on a level which is characterized by the easiness and rapidity with which the level vial may be accurately calibrated relative to a surface of the level.

It is also an object of the present invention to provide such a mounting arrangement for mounting a level vial on a level wherein the level vial is readily mountable without the use of tools on a mounting member of novel construction.

Another object of the present invention is to provide such a mounting arrangement for mounting a level vial on a level wherein the level vial when mounted on the level is exposed for 360° reading.

A further object of the present invention is to provide a simple and fast method of accurately assembling and calibrating a level vial on a measuring tool.

SUMMARY OF THE INVENTION

It has now been found that the foregoing and related objects can be readily attained by means of a level vial holder comprising a level vial, which is operable for indicating the orientation of a workpiece relative to a given plane, and a mounting member which includes a first means for mounting the level vial thereon and a second means for mounting the mounting member with the level vial in place thereon on to a measuring tool such as a level and the like. The level vial is retained on the mounting member by means of a snap fit which mechanically locks the level vial in place thereon. The mounting member in turn is mountable on a seating portion suitably provided on one leg of a level. More particularly, the seating portion comprises a planar surface formed at the outer end of an upstanding portion and in spaced relation to the planar surface utilized for purposes of positioning the level against a workpiece the orientation of which is to be determined.

In accordance with the preferred embodiment of the invention, the aforementioned level vial comprises a tube or vial formed of plastic material. The vial is filled with a liquid such that a bubble exists therein, and has indicating means in the form of a pair of spaced lines provided thereon. The mounting member is integrally formed of plastic material, and includes a center section and the previously mentioned first and second mounting means. The first mounting means comprises a first recess for receiving the ends of the level vial with the aforedescribed snap fit, and an end cap formed at each end of the mounting member. The end caps are operable to prevent axial movement of the level vial on the mounting member. The center section of the mounting member includes a second recess whereby with the level vial positioned in the aforesaid first recess the level vial is exposed for a 360° reading. The second mounting means comprises an arcuate portion formed on the center section on a surface thereof oposite to that on which the second recess is to be found, and a pair of spaced depending arms extending outwardly from the center section of the mounting member on either side of the arcuate portion. The spacing of the depending arms is such that with the level vial holder mounted on a seating portion, the latter comprising a planar surface formed on a measuring tool such as a level and the like, the pair of depending arms straddle the planar surface and the arcuate portion is in contact therewith. For purposes of calibrating the level vial relative to a surface of the measuring tool, the level vial holder is rocked with the arcuate portion being rocked to a position on the planar surface wherein the level vial is set, i.e., to a position wherein a parallel relationship is established between the level vial and a given surface of the measuring tool. Thereafter, suitable securing means such as adhesive or the like is employed to secure the level vial holder on the measuring tool such that the level vial is retained in its calibrated position.

Certain objects of the invention may be attained in accordance with the method wherein a level vial is assembled on a measuring tool whereby to be operable for indicating orientation of a workpiece relative to a given plane. In accord with this method, the level vial is inserted in a mounting member with a snap fit to mechanically lock the level vial on the mounting member and in such a position that the level vial is exposed for a 360° reading. The mounting member is then positioned on a seating portion provided for this purpose on a measuring tool. Subsequently, the level vial is calibrated by means of rocking the mounting member relative to the seating portion of the measuring tool. Thereafter, the mounting member is frictionally retained positioned on the measuring tool with the level vial calibrated to a surface of the measuring tool. The final step in the method is preferably the application of adhesive to secure the mounting member on the measuring tool with the level vial calibrated to a surface of the measuring tool.

As used herein the term "level" includes measuring tools having a single rectilinear leg, squares having a pair of legs intersecting at a right angle and other measuring tools having at least one leg which is intended for placement against a surface of a workpiece or structure to determine the orientation thereof with respect to a plane which may be horizontal, vertical or at some other angle to the horizontal.

DETAILED DESCRIPTION OF THE ILLUSTRATED EMBODIMENT

Figure 1:
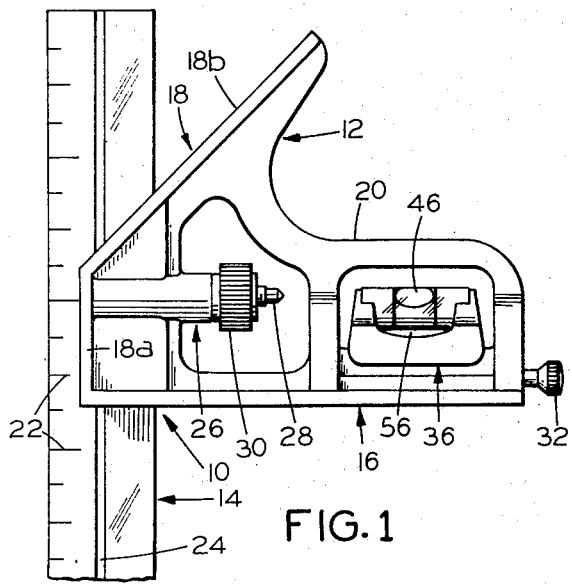
FIG. 1 is a side elevational view of a combination measuring tool with a level vial holder mounted thereon in accordance with the present invention, and illustrated with the combination tool positioned such that the level vial is upright.
Figure 2:
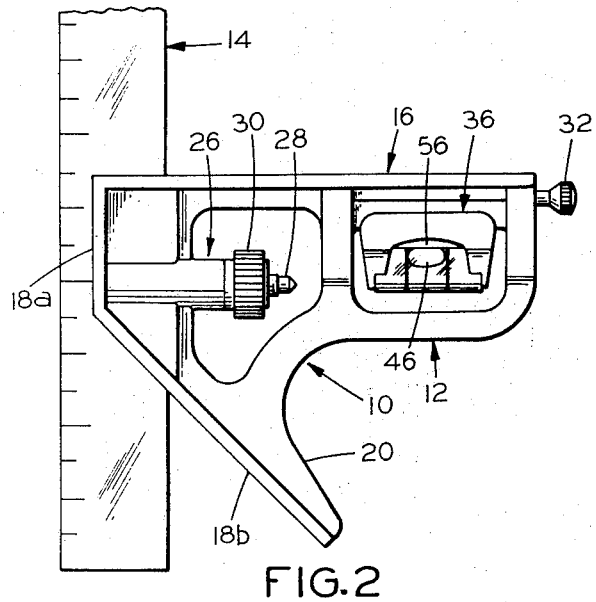
FIG. 2 is a side elevational view similar to FIG. 1 of a combination measuring tool with a level vial holder mounted thereon in accordance with the present invention, but illustrated with the combination tool positioned such that the level vial is inverted.

Referring now to FIGS. 1 and 2 of the drawings, there is illustrated therein a combination measuring tool, generally designated by reference numeral 10, and including a level 12 and a straight edge 14. For purposes of illustration, the combination measuring tool 10 has been depicted in the drawings as constituting a combination square and with level 12 and straight edge 14 comprising a square and a rule, respectively. However, inasmuch as the invention is not limited in its applicability to a combination square but rather is capable of being used with a variety of different kinds of measuring tools, in the description of the invention which follows such hereinafter, it is to be understood that the terms "combination measuring tool," "level," and "straight edge" are being used in their generic sense, and are therefore not to be construed as applying solely to a combination square and its component parts.

Proceeding with a description of level 12, the latter includes a pair of integrally formed legs 16 and 18. The legs 16 and 18 are each of generally T-shaped cross sectional configuration as best understood with reference to the illustration of a portion of leg 16 in FIG. 5. The legs 16 and 18 are joined such that leg 16 intersects at right angles with a portion 18a of leg 18. The other portion, i.e., portion 18b of leg 18, in accord with the embodiment of level 12 shown in the drawings, is joined with portion 18a such as to intersect the latter at an angle of 45°. The outer end of leg 16 and the outer end of portion 18b of leg 18 are interconnected by means of handlelike portion 20 integrally formed as a portion of the level 12. The portion 20 is preferably suitably configured such as to have a curvature which enables the portion 20 to be conveniently grasped by a craftsman thereby facilitating the usage of a measuring tool 10. Although not depicted in the drawings, it is to understood that commonly leg 16 and leg 18 are each provided with suitable indicia of measurement. Such indicia (not shown) may either be integrally formed in the material of level 12 or else they may be affixed thereto by printing, decals, or the like.

Turning now to a consideration of straight edge 14, the latter comprises a rule suitably provided with indicia 22 employable for purposes of making straight line measurements on an object. In this connection, the indicia 22 which constitutes measurements of length may either by integrally formed in the material of straight edge 14 or else they may be affixed thereto by printing, decals, or the like. In addition, straight edge 14 is provided with a longitudinally extending groove 24 formed substantially midway between the edges of the straight edge 14. The straight edge 14 is cooperatively dimensioned particularly insofar as concerns the width or thickness thereof as well as the positioning of groove 24 therein such as to be receivable within a slot (not shown) provided for this purpose in leg 18 of the level 12.

For purposes of retaining straight edge 14 mounted to level 12, the latter is provided with a conventional retaining assembly 26. The structure thereof as is well known to those skilled in the art includes a boss 28 formed integrally in the material of level 12 so as to extend inwardly from the planar edge surface of portion 18a of leg 18 in a direction substantially normal thereto. Boss 26 is suitably provided with an opening (not shown) which communicates with the slot (not shown) in leg 18 described in the preceding paragraph for receiving the straight edge 14. In addition, the opening (not shown) in boss 26 has positioned therein a screw 28 which is cooperatively associated at one end with the knurled nut 30. The screw 28 is provided at its other end with suitable means (not shown) which cooperates with the straight edge 14 whereby the latter is positioned in the aforedescribed slot the rotation of knurled nut 30 in one direction functions to securely retain the straight edge 14 in its assembled condition within leg 18 of level 12. To disassemble straight edge 14 from level 12, knurled nut 30 must, of course, be rotated in the opposite direction.

In accord with the embodiment of the level 12 illustrated in the drawings, level 12 is preferably provided with a marking member comprising a scriber 32. The latter is detachably positioned in an opening 34 suitably provided for this purpose in leg 16. The scriber 32 is desirably employed for purposes of making marks on a workpiece or surface whereby to record on the latter measurements which have been made relative thereto by using the combination measuring tool 10.

With particular reference now to FIGS. 3-6 of the drawings, combination measuring tool 10 is provided with a level vial holder generally designated by the reference numeral 36. As will be described more fully hereinafter, the level vial 36 is mounted on a seating portion 38 which includes, as best understood with reference to FIG. 5, a planar surface 38a formed at the outer end of upstanding portion 40 of leg 16. The planar surface 38a is formed such that it lies in a plane which is spaced from but which is parallel to the planar edge surface 16a of leg 16.

Level vial holder 36 includes a level vial 42 and a mounting member 44. The level vial 42 in accord with the illustrated embodiment of the invention consists of a tube or vial which is integrally formed from a synthetic plastic. The vial 42 is filled with a conventional liquid in a manner such that a bubble 46 is provided therein. In addition, as shown in the drawings, vial 42 is provided with indicating means comprising a pair of spaced lines 48. The latter lines 48 function as a reference whereby with the planar edge surface 16a of legs 16 positioned in stable relationship against a workpiece or surface the orientation of the latter relative to a given plane is indicated by the location of the bubble 46 relative to the space between the lines 48. Although the level vial 42 has been depicted as being provided with indicating means in the form of the spaced lines 48, other forms of indicating means such as a single center line, etc. could equally well be substituted for the lines 48 if so desired without departing from the essence of the invention.

As regards mounting member 44, the latter, which is preferably formed of synthetic plastic, includes a center section 50, and first and second mounting means. The first mounting means with which the mounting member 44 is provided is employed for purposes of mounting the level vial 42 on mounting member 44 whereas the second mounting means is utilized to mount the mounting member 44 with level vial 42 in place thereon on seating portion 38 provided on level 12.

The first mounting means of the mounting member 44 comprises a first recess 52 which is cooperatively dimensioned relative to the level vial 42 such as to be capable of receiving the level vial 42 with a snap fit whereby to mechanically lock the level vial 42 in place on the mounting member 44. In addition, the first mounting means further comprises a pair of end caps 54 formed at either end of the recess 52 in mounting member 44. With the level vial 42 positioned in the recess 52, the end caps 54 function to prevent axial movement of the level vial 42 relative to the mounting member 44.

Figure 4:
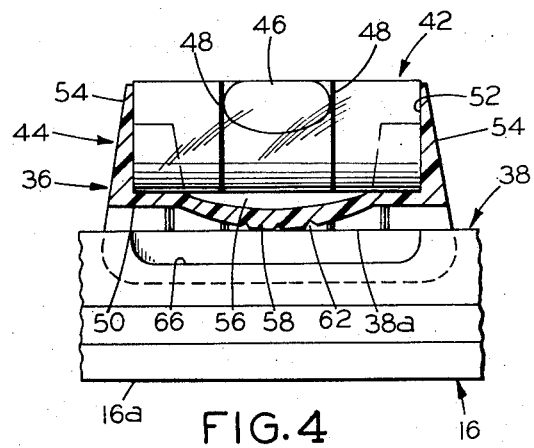
FIG. 4 is a side elevational view, on a larger scale, of a level vial holder in accordance with the present invention illustrated mounted on the seating portion of the combination measuring tool and with parts broken away for purposes of clarity of illustration.
Figure 5:
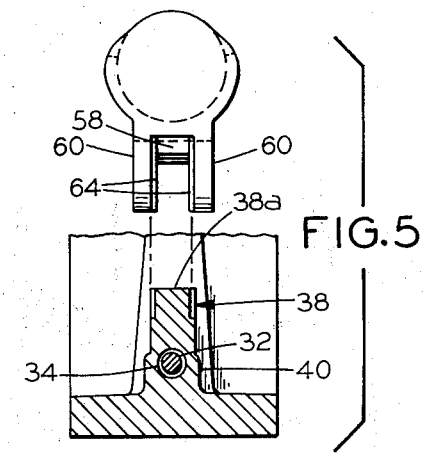
FIG. 5 is a sectional view of the seating portion of the combination measuring tool on which the level vial holder illustrated exploded therefrom is mounted, taken approximately along the sectional Line 5—5 of FIG. 3.

The second mounting means of mounting member 44 comprises an arcuate portion 58, i.e., a convex portion which is formed on the lower surface of center section 50 as viewed with reference to FIG. 4 of the drawing. In addition, the second mounting means further comprises a pair of spaced depending arms 60 which in accord with the illustrated embodiment of the invention are integrally joined to the center section 50. As best shown in FIG. 5 of the drawing, the arms 60 depend from center section 50 in a manner such that they extend outwardly on either side of arcuate portion 58. The arms 60 of mounting member 44 and the seating portion 38 of level 12 are cooperatively dimensioned such that the spacing between the arms 60 corresponds with the width, i.e., thickness of the seating portion 38. As such the mounting member 44 is capable of being positioned on the seating portion 38 such that the depending arms 60 straddle the seating portion 38 in abutting relation relative thereto. It will be noted particularly with reference to FIG. 5 of the drawing that the mounting member 44 is wider at the outer end thereof than at the lower end thereof. That is, the width of the end caps 54 is greater than the distance measured from the outer surface of one of the arms 60 to the outer surface of the other arm 60. Basically, this dimensional relationship is occasioned by the fact that the diameter of the level vial 42 measures a value which exceeds that of the measured width of the upstanding portion 40 of the leg 16. However, it is to be understood that the mounting member 44 could take other configurations without departing from the essence of the invention as long as the relationship is maintained wherein the spacing between the arms 60 corresponds to the width of the seating portion 38 and the diameter of the recess 52 is sufficient to receive the level vial 42 with a snap fit.

Figure 6:
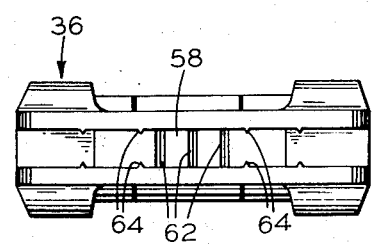
FIG. 6 is a bottom plan view of a level vial holder constructed in accordance with the present invention.
Figure 3:
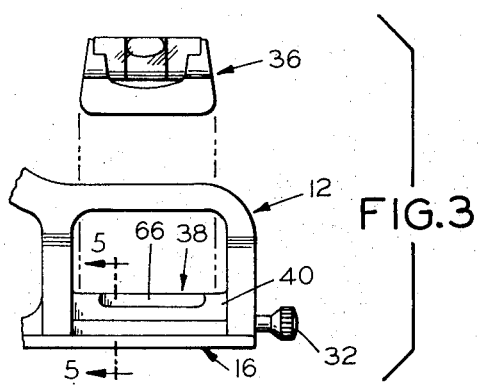
FIG. 3 is a side elevational view of a portion of the combination measuring tool of FIG. 1 with the level vial holder exploded therefrom, illustrating the seating portion on which the level vial holder is mounted.

In accord with the embodiment of the invention illustrated in the drawing, the arcuate, i.e., convex portion 58 is preferably provided with a plurality of spaced grooves 62. The grooves 62 extend transversely across the arcuate portion 58 between a pair of depending arms 60, and as will be described in more detail hereinafter function to receive any excess of the adhesive preferably utilized in securing level vial holder 36 on seating portion 38. Also as depicted in FIG. 6 of the drawings, each of the depending arms 60 is preferably provided with a plurality of ribs 64 formed integrally in the inner surface of each of the arms 60 in spaced relation relative to each other and such as to extend the length from top to bottom of the arms 60. With the level vial holder 36 positioned on the seating portion 38, the ribs 64 function to frictionally engage opposite sides of the seating portion 38 for a purpose yet to be described.

With regard now to the method of assembly of level vial holder 36, the level vial 42 is first inserted into the recess 52 of mounting member 44. As noted previously, the level vial 42 and the recess 52 are cooperatively dimensioned such that the level vial 42 is received in recess 52 with a snap fit whereby the level vial 42 is mechanically locked in place on the mounting member 44. The inherent resiliency of the level vial 42 along with that of the mounting member 44 stemming from the fact that they are each formed from an impact resistant synthetic plastic facilitates the insertion and the achievement of a snap fit of the level vial 42 in the recess 52. In addition, the end caps 54 function to engage the opposite ends of the level vial 42 and thereby capture the level vial 42 therebetween. As such, the end caps 54 are operable to prevent any axial movement of the level vial 42 within recess 52.

With the level vial 42 securely retained in place on the mounting member 44 the inner surface of arms 60 and the arcuate portion 58 are each coated with a suitable adhesive. Thereafter, the level vial holder 36 is positioned on the seating portion 38 such that as shown in FIG. 4 of the drawings, the arcuate portion 58 is in contact with the planar surface 38a of seating portion 38 and so that the arms 60 depend on either side of the seating portion 38. In this connection, it will be noted that the upstanding portion 40 is provided with a slightly recessed area 66 which denotes the location on the leg 16 whereat the level vial holder 36 is intended to be positioned. Also, as will be described subsequently the recessed area 66 serves to receive the ribs 64 and as a depository for at least some of the adhesive carried on the inner surface of the mounting member 44 and which is utilized to secure the level vial holder 36 in place on seating portion 38.

By virtue of the fact that the arms 60 and the width of the seating portion 38 are cooperatively dimensioned, the arms 60 fit snugly about the side surfaces of the seating portion 38 whereby to facilitate stable adjustment during assembly as will be described subsequently and to ensure permanent engagement during the use. In this connection, internal ribs 64 which in the preferred embodiment of the invention are slightly tapered relative to the inner surface of the arms 60 pinch the side walls of seating portion 38 so as to provide a tight fit therebetween and also to afford where necessary a means of compensating for some degree of thickness variation in the seating portion 38.

Now with the level vial holder 36 so positioned on seating portion 38, the holder 36 is rocked relative to seating portion 38. More specifically, the arcuate portion 58 which is in engagement with the planar surface 38a is rocked about a point along the latter surface whereat the convexly arcuate portion 58 makes point contact with planar surface 38a until the bubble 46 is aligned between the pair of spaced lines 48 in the manner depicted in FIG. 4 thereby setting, i.e., calibrating the level vial 42 relative to the planar edge surface 16a of leg 16. The level vial holder 36 is permitted to remain in this position relative to seating portion 38 for a sufficient period of time to allow the adhesive employed to secure holder 36 on seating portion 38 to set completely and bond the members together. Normally, the frictional engagement of ribs 64 with the side walls of the seating portion 38 is sufficient to maintain the level vial holder 36 positioned on the seating portion 38 with the level vial 42 remaining calibrated to the planar edge surface 16a of leg 16 without resorting to the use of any tools and/or fixtures.

Although adhesive has been described hereinbelow as the means employed to secure level vial holder 36 on seating portion 38, other means for securing the holder 36 on portion 38 may be employed. In this connection, it has been found that generally the frictional engagement of ribs 64 with the side walls of seating portion 38 will not be completely satisfactory and some additional securing means is desirable. Solvent or heat application to the surfaces of certain synthetic plastics from which the mounting member 44 may be formed may suffice to provide the necessary adhesion in place of an interposed adhesive coating. Also, if desired, portions of the arms 60 and the seating portion 38 may be deformed by staking or the like to effect mechanical engagement and locking thereof. On the other hand, pins or rivets may be inserted or any other suitable means known to those having ordinary skill in the art may also be employed to lock level vial holder 36 on the seating portion 38 of level 12.

To utilize the level vial 42 for indicating the orientation of a workpiece or surface relative to a plane which may be horizontal or vertical, the straight edge 14 is either removed from the level 12 by loosening the knurled nut 30 and sliding the straight edge 14 out of the slot provided therefor in the leg 18 or else the straight edge 14 is suitably positioned in the slot in the leg 18 such that the straight edge 14 does not extend outwardly beyond the plane of the planar edge surface 16a of leg 16. Planar edge surface 16a is then positioned in stable relationship against the workpiece or the surface the orientation of which it is desired to determine. The level 12 is maintained in this position until the bubble 46 stabilizes such that it is possible to obtain a reading as to the position of the bubble 46 relative to the space between the lines 48. It is important to note here that it is a unique feature of the combination measuring tool 10 that by virtue of the recess 56 formed in the mounting member 44 the level vial 42 is capable of providing a 360° reading. This has been exemplified in the illustration of FIG. 1 wherein the level vial 42 is positioned in its upright position and the bubble 46 is clearly visible and in the illustration of FIG. 2 wherein the level vial is positioned in its inverted position and the bubble 46 still remains clearly visible.

In accordance with the illustrated embodiment of the invention, the snap fit of the level vial 42 in the mounting member 44 is accomplished through the use of an elongated recess 52 defined by suitably configured side walls provided in the latter member 44 and a pair of end caps 54, the latter functioning to capture the level vial 42 therebetween. However, as previously noted hereinabove, the mounting member 44 may be configured in other ways without departing from the essence of the invention. In this connection, it is contemplated that the snap fit of the level vial 42 in the mounting member 44 could be achieved by other means such as by providing the mounting member 44 with snugly fitting partial side walls whereby the side walls would serve to hold a vial 42 captured therebetween. Although the intent of such a modification would be to have the side walls provide the necessary retention of the level vial 42, minimal end walls would preferably also be provided for the purpose of creating some minimal form of obstacle to further ensure that the level vial 42 would not escape through either end of the mounting member 44. As such, these end walls might for example be configured in the form of a horseshoe wherein the internal circumference of the horseshoe is less than the external circumference of the level vial 42, or the end walls could be shaped in a semicircle, i.e., be of half-moon shape whereby to provide an obstruction to the passage of the level vial 42 through the ends of mounting member 44. Thus, it is seen that the side walls of the mounting member 44 which define the recess 52 and/or the end walls of the mounting member 44 could be formed in a variety of other configurations without departing from the essence of the invention as long as these other modifications essentially meet the following three requirements: first, that the transverse distance between the side walls is such as to define a recess therebetween which is capable of snugly receiving the level vial with a snap fit whereby to mechanically lock the vial in place on the mounting member, secondly, that a suitable viewing aperture be provided in the side walls whereby to expose the indicating means formed on the level vial for a 360° reading, and thirdly, that the side walls and end walls cooperate to securely retain the level vial mounted in place on the mounting member without the use of other securing means such as adhesive, etc.

Thus, it can be seen that the present invention provides a novel and improved mounting arrangement for mounting a level vial on a level. The subject mounting arrangement is characterized by the easiness and rapidity with which the level vial may be accurately calibrated relative to a surface of the level. In accord with the present invention, a mounting arrangement has been provided wherein the level vial is readily mountable without the use of tools on a mounting member of novel construction. The level vial when mounted on the level in accord with the mounting arrangement of the present invention is exposed for a 360° reading. Finally, in accordance with the present invention, there has been provided a simple and fast method of accurately assembling and calibrating a level vial on a measuring tool.

Having thus described the invention, I claim:

1. In a level having at least a first leg, said first leg including a substantially planar surface for stable placement against a workpiece and a seating portion spaced therefrom providing a planar surface on the surface of said leg spaced from said first-mentioned planar surface, the combination therewith of level vial holder means, said level vial holder means comprising:
  a. a transparent level vial for indicating the orientation of a workpiece relative to a given plane;
  b. a mounting member mounting said level vial on said seating portion with the axis of said level vial extending parallel to said first-mentioned planar surface;
    i. said mounting member having a first recess for receiving said level vial with a snap fit to mechanically lock said level vial in place on said mounting member;
    ii. said mounting member including an end cap at each end of said vial for preventing axial movement of said level vial on said mounting member;
    iii. said mounting member including a center section having a first surface adjacent said vial and a second surface adjacent said leg seating portion, said first surface defining a second recess below said vial cooperating with the configuration of said first recess to expose at least the central portion of said level vial for a 360° reading, said mounting member exposing the upper portion of said level vial for viewing of its entire length, and said second surface including a convexly arcuate portion cooperating with said planar surface of said seating portion to permit rocking about a point thereon and sliding therealong for accurately positioning said level vial parallel to said first-mentioned planar surface in predetermined location along the length of said first leg;
    iv. said mounting member including a pair of depending arms extending outwardly from said center section along the side surface of said first leg adjacent said seating portion; and
  c. means securing said mounting member on said seating portion after said level vial is calibrated relative to the orientation of said substantially planar surface of said first leg.

2. In a level as set forth in claim 1 wherein said mounting member is formed integrally from plastic material, and said means securing said mounting member on said seating portion comprises an adhesive.

3. In a level as set forth in claim 1 wherein said arcuate portion of said center section of said mounting member is provided with a plurality of grooves for receiving excess adhesive, and said pair of depending arms are each provided on one surface thereof with a plurality of ribs for frictionally engaging the side walls of said seating portion to retain said mounting member properly in place on said seating portion while said adhesive sets.

4. A combination measuring tool for determining the orientation of a workpiece relative to a given plane comprising:
  a. first measuring means including a first leg and a second leg, said second leg being joined to and extending outwardly from one end to said first leg;
    i. said first leg including a first substantially planar surface for stable placement against a workpiece and a seating portion spaced therefrom providing a second substantially planar surface on the surface of said leg spaced from said first-mentioned planar surface;
  b. second measuring means detachably mounted on one of said first and second legs of said first measuring means;
  c. level vial holder means comprising a level vial and mounting member;
    i. said mounting member having a first recess for receiving said level vial with a snap fit to mechanically lock said level vial in place on said mounting member;
    ii. said mounting member including a center section having a first surface adjacent said vial and a second surface adjacent said leg seating portion, said first surface defining a second recess below said vial cooperating with the configuration of said first recess to expose at least the central portion of said level vial for a 360° reading, said mounting member exposing the upper portion of said level vial for viewing of its entire length, and said second surface including a convexly arcuate portion cooperating with said planar surface of said seating portion to permit rocking about a point thereon and sliding therealong for accurately positioning said level vial parallel to said first-mentioned planar surface in predetermined location along the length of said first leg;
    iii. said mounting member including a pair of depending arms extending outwardly from said center section along the side surface of said first leg adjacent said seatin portion; and
  d. means securing said mounting member of said level vial holder means on said seating portion of said fist leg of said first measuring means after said level vial is calibrated relative to the orientation of said first substantially planar surface of said first leg and with said arcuate portion in engagement with said second substantially planar surface and said pair of depending arms straddling said seating portion.

5. A combination measuring tool as set forth in claim 4 wherein said combination measuring tool comprises a combination square, said first measuring means comprises a level, and said second measuring means comprises a rule.

6. A combination measuring tool as set forth in claim 4 further comprising marking means detachably mounted on said first leg of said first measuring means, and wherein said second measuring means is detachably mounted on said second leg of said first measuring means and said second leg of said first measuring means is joined to said first leg of said first measuring means such that at least a portion of said second leg extends in a direction normal to said first leg.

7. A method of assembling a level vial on a measuring tool comprises the steps of:
 a. forming a mounting member of synthetic plastic material with a recess in its upper surface dimensioned and configured to receive an elongated level vial and a convexly arcuate portion on its lower surface;
 b. inserting an elongated cylindrical transparent level vial with a snap fit into the cooperatively dimensioned recess in said mounting member to mechanically lock the level vial in said mounting member and to prevent axial movement of the level vial relative to the recess, said mounting member being configured to expose substantially the entire circumference of the level at its center portion for viewing;
 c. positioning the convexly arcuate surface of said mounting member with the level vial in place thereon on a substantially planar seating surface of a measuring tool, said planar seating surface extending substantially parallel to a planar surface spaced therefrom adapted to be placed against the surface of a workpiece, said arcuate surface providing rockable point contact between the mounting member and the planar seating surface of said measuring tool;
 d. adjusting the position of said mounting member on said measuring tool by rocking the mounting member relative to the measuring tool about a point on said first-mentioned seating surface whereat the mounting member makes point contact with the measuring tool in order to calibrate the level vial in a position parallel to said second-mentioned planar surface of the measuring tool; and
 e. securing said mounting member on said measuring tool with the level vial calibrated in said calibrated parallel position.

8. A method of assembling a level vial on a measuring tool comprising the steps of:
 a. forming a mounting member of synthetic plastic material with a recess in its upper surface dimensioned and configured to receive an elongated level vial and with a convexly arcuate portion on its lower surface;
 b. inserting an elongated cylindrical transparent level vial with a snap fit into the cooperatively dimensioned recess in said mounting member to mechanically lock the level vial in said mounting member and to expose the level vial for a 360° reading;
 c. positioning the convexly arcuate surface of said mounting member with the level vial in place thereon on a substantially planar seating surface of a measuring tool, said planar seating surface extending substantially parallel to a planar surface spaced therefrom adapted to be placed against the surface of a workpiece, said arcuate surface providing rockable point contact between the mounting member and the planar seating surface of said measuring tool;
 d. adjusting the position of said mounting member on said measuring tool by rocking the arcuate surface of the mounting member relative to the first-mentioned planar seating surface of the measuring tool about a point on said first-mentioned seating surface whereat the arcuate surface makes point contact with the planar seating surface in order to calibrate the level vial in a position parallel to said second-mentioned planar surface of the measuring tool;
 e. frictionally retaining the mounting member positioned on the measuring tool with the level vial calibrated to a surface of the measuring tool; and
 f. causing adhesive applied to said mounting member to secure the mounting member on the measuring tool with the level vial calibrated in said parallel position relative to said second-mentioned seating surface.

* * * * *

UNITED STATES PATENT OFFICE
CERTIFICATE OF CORRECTION

Patent No. 3,824,700            Dated July 23, 1974

Inventor(s) Edward C. Rutty

It is certified that error appears in the above-identified patent and that said Letters Patent are hereby corrected as shown below:

Column 10, line 13, "to" should be --of--.

Column 10, line 49, "seatin" should be --seating--.

Column 10, line 52, "fist" should be --first--.

Column 11, line 11, "and a" should be --and with a--.

Column 11, line 20, "level at" should be --level vial at--.

Signed and sealed this 29th day of October 1974.

(SEAL)
Attest:

McCOY M. GIBSON JR.
Attesting Officer

C. MARSHALL DANN
Commissioner of Patents

FORM PO-1050 (10-69)